UNITED STATES PATENT OFFICE.

THOMAS S. BLAIR, OF PITTSBURG, PENNSYLVANIA.

IMPROVEMENT IN THE MANUFACTURE OF WROUGHT-IRON AND STEEL FROM IRON SPONGE.

Specification forming part of Letters Patent No. 126,923, dated May 21, 1872.

SPECIFICATION.

*To all whom it may concern:*

Be it known that I, THOMAS S. BLAIR, of Pittsburg, in the county of Allegheny and State of Pennsylvania, have invented a new and useful Improvement in the Manufacture of Wrought-Iron and Steel from Iron Sponge; and I do hereby declare the following to be a full, clear, and exact description thereof.

My invention relates to the manufacture of wrought or malleable iron and steel from iron-sponge, prepared by the deoxidation without fusion of iron ore.

In another specification I have fully described the apparatus I employ, and the process I use in deoxidizing the iron ore for the production of metallic sponge. It is therefore unnecessary to say more here in regard to the production of the sponge, than that by my process the ore is almost entirely deoxidized, sufficiently so, at least, for all practical purposes in the production therefrom of iron and steel; and, also, that when the sponge is delivered from the reducing-furnace it is cold, or at least so nearly so as not to be liable to oxidation from contact with atmospheric air.

In the manufacture of wrought-iron from iron sponge I employ either of the two methods hereinafter described. The first method may be regarded as an adjunct to the puddling process. Its essential feature is the imparting of the sponge to the charge of pig-iron in the puddling-furnace at any time after the pig-iron has been melted—that is to say, the sponge may be charged into the puddling-furnace as soon as the pig-iron has become liquid, or it may be added in small quantities from time to time during the working of the heat, or it may be thrown in after the iron has come to nature and during the balling. It is wasteful to introduce the sponge into the puddling-furnace before the pig-iron is melted, but after that it may be profitably used at any stage of the process of bringing the pig-iron to nature. The effect of the addition of the iron sponge to the charge of pig-iron is that it facilitates and hastens the coming to nature of the iron and improves its quality. So far as the success of the operation is concerned, any relative proportion of sponge and pig-iron may be used. The most profitable ratio will be determined by their relative cost of production, which will vary under varying conditions of manufacture. Under ordinary circumstances the sponge can be produced at much less expense than the pig-iron, and it costs also much less to work the mixed charge than it does to work the pig-iron alone. So far as the process of working the mixed charge is concerned, the introduction of the sponge makes no difference other than is due to the greater rapidity with which the pig-iron comes to nature.

The second method dispenses with the use of pig-iron, the sponge being worked alone. For this purpose I use a reverberatory-furnace with cinder bottom. The charge of iron sponge is thrown into the heated furnace and is treated as if it were minutely-divided wrought-iron scraps, (such as fine borings or turnings of wrought-iron,) with one exception, which I will proceed to describe. The sponge is, when heated to a red heat, extremely sensitive to oxygen, much more so than finely-comminuted wrought-iron, and has also a considerable quantity of mineral matter intimately associated with it. If, therefore, it were simply placed in a reverberatory-furnace and heated to a welding heat and then balled, there would be an excessive waste, and the quality of the iron produced would not be good. This fact which constitutes the main difficulty of working iron sponge into malleable iron, renders it necessary to use some means for protecting the minute particles of iron which constitute the sponge from oxidation. This I accomplish by supplying the charge of sponge, either before or after introducing it into the furnace, with some substance or substances having affinity for the foreign mineral matter associated with the sponge, so that under the heat of the furnace they will combine and form a glass, thereby not only fluxing out the impurities from the iron, but also forming a protecting coating to the particles of sensitive iron. For example, if the sponge is found to contain an excess of silica, I add to the charge either the protoxide of iron, (which is always at hand in the form of scales, hammer-slag, &c.,) or basic minerals, such as lime, alumina, &c. Should lime be present in excess in the sponge I add alumina or silica. The kind of flux to be used depends therefore on the character of the foreign matter existing in the iron sponge, the important point being to supply a fluxing substance which will combine with the foreign matter in the sponge at a sufficiently low heat to make a cinder or glass, and thus furnish the desired protection to the particles of iron. When clay or other substances which dissolve in water are employed as the fluxing and protecting material, I prefer to add water enough to them to make a thin paste before mixing with the sponge. Then I stir this paste and the sponge together until a thorough coating of the latter is produced. The furnace should be so arranged as to admit as little free oxygen as possible into the working-chamber. On this account I prefer to use Siemen's regenerative furnace for this purpose. Thus treated, the sponge, as soon as sufficiently heated, comes to a welding state and can be readily balled, after which it may be manipulated in the same way as puddle-balls.

I will now proceed to describe my method of making steel from iron sponge.

In speaking of "steel" as contradistinguished from "wrought-iron," I wish to be understood as meaning by the latter term iron associated with so small a percentage of carbon that it cannot be manipulated in a molten state, and by "steel" any malleable carbide of iron that is capable of being cast into an ingot.

In order to make steel from iron sponge I subject it to fusion, in presence of the proper proportion of carbon, either in a crucible or upon the open hearth. I will first describe the crucible treatment. In order to make this process economically successful it is essential that the crucible shall contain a charge sufficient in quantity to yield as large a product as is obtained by the existing methods of making cast-steel in crucibles. The sponge, however, is so very light in texture that, unless highly compressed, it is impossible to charge a sufficient amount into the crucibles. Chenot endeavored to obviate this difficulty and give the required density to his deoxidized ore by pulverizing it and compressing it when cold. He did not succeed, however, owing no doubt to the imperfection of the article produced by his deoxidizing process, or, rather, to the fact that his product was not really metallic sponge, but a conglomerate of more or less perfectly-reduced ore, so that he was not able by compression to cause the particles to unite and give the requisite density to the mass. It is, therefore, essential to the economic success of the process of making steel in crucibles from iron sponge that the sponge itself should have such a degree of purity as to be practically free from particles of solid carbon, and also consist of particles thoroughly and uniformly reduced. This I effect by my peculiar process of making iron sponge described in a separate specification before referred to.

In order to secure the requisite density of the sponge for the crucible treatment I cause it to be ground or finely pulverized, so that the disintegration of the spongy lumps may not have to be performed by the power applied to effect the condensation. The comminuted sponge is then heated red hot, and in that condition is subjected to powerful compression. While thus heating the sponge it is, of course, all important to protect it from oxidation, which would occur if it were exposed to contact with the atmosphere. This I effect by packing the sponge powder, or partially-compressed sponge, in cases made of iron, fire-clay, or other suitable material which will bear the requisite heat and protect their contents from the atmosphere. These cases may be made of any convenient size and shape in cross-section, having parallel sides and closed at top by a loose cap or follower. The cases are then heated to redness in a muffle, and each case is placed in a clamp, so as to support the sides of the case and prevent its bursting. Pressure is then applied to the cap or follower, by means of screw, hydraulic press, or otherwise, until the red-hot mass is sufficiently condensed.

Instead of using a case, as described, the comminuted sponge may first be compressed while cold, which will cause the particles to cohere into a solid mass. The block thus obtained is then coated with mud or other similar adhesive preparation which will resist the action of the heat and protect the iron from the air. These blocks are then heated and subjected to further pressure to give them the density required, which is easily obtained if a fair red heat is employed.

It has been usually assumed by inventors and others that if a really pure metallic iron sponge could be procured nothing further would be necessary to make good steel therefrom than to treat it in the crucible simply as if it were wrought-iron. This, however, is seldom the case, as it only occurs when the ore which has been reduced to sponge happens to contain the proper balance of acids and bases to form a glass, thus preventing the combination of the mineral impurities with the steel, which would greatly deteriorate the quality or render it worthless.

The ores chiefly employed in the United States in the manufacture of steel contain over ninety per cent. of oxide of iron, the residue being foreign substances which usually contain an excess of silica, which is not removed by the process of reduction from oxide to metallic sponge. At the high temperature employed in the melting-furnace, and in the presence of the free carbon introduced with the charge into the crucible, a considerable quantity of this silica would be reduced, and the resulting silicon would be more or less infused into the steel, probably rendering it worthless. In order to obviate this difficulty and supply the requisite balance for the silicic acid I mix with the comminuted sponge, before pressing, a sufficient amount of finely-pulverized lime, the quantity being dependent upon the proportion of silica in the sponge. The result of this presence of lime in the sponge is that, before the temperature of the crucible has reached the point at which the reduction of the silica into silicon by carbon would take place, the lime and silica have united to form a glass which thereafter remains neutral, and, holding the silica in combination, prevents its contaminating the steel. Should the sponge contain lime in excess, sand or clay is added to the sponge powder, so as to present silica or alumina to the basic ingredients, and thus prevent their entering into combination with the steel. Iron sponge thus prepared by the systematic admixture of suitable fluxing ingredients, and by red-hot compression can then be used in crucibles in like manner as wrought-iron for the manufacture of steel.

The other method of making cast-steel by means of metallic iron sponge is by melting it on an open hearth. This method, (known as the Siemens-Martin process,) as heretofore practiced, consists in melting a charge of pig-iron in the hearth of a Siemens furnace until it reaches a high white heat, and then adding to the bath of melted metal successive charges of wrought-iron previously brought to a bright-red heat, which imbibe the carbon from the pig-iron, and are melted therein, thereby forming a homogeneous mass of steel, the quality of which, as to hardness, is regulated by the proportion of wrought-iron used, or by the addition of more pig-iron. For this purpose I substitute metallic sponge for the ordinary malleable iron. The former being much more sensitive to carbon, and more easily acted upon, shortens the process and improves the result. The sponge may be supplied to the cast-iron bath in either of three different ways: First, the sponge may be charged into the bath of melted metal from time to time without previous heating or compression; or, second, it may be first compressed into blocks, in which case it may, if preferred, be heated red-hot before being charged; or, third, the sponge, before being charged, may be previously brought to a plastic condition in a separate furnace. It will readily be seen that the sponge, by reason of its comminuted condition and porous texture, is more readily mixed with the melted cast-iron than ordinary wrought-iron, and being extremely sensitive is more rapidly melted. It might be supposed that the sponge, being reduced directly from the ore, and not subjected to any process for removing the silica, could not be thus used for making steel without special fluxing. This, however, is not the case, as it has been ascertained that fluid cast-iron does not, in the presence of silica or silicates, take up the silicon. The foreign ingredients present in the sponge will therefore be liquefied at the temperature employed in the Siemens-Martin process, and will mingle with the other slag, and thus pass off without contaminating the steel.

This process of making steel by the use of sponge possesses great advantages over any other hitherto employed, both as regards the cost and quality of the product. Especially is this the case as compared with the pneumatic process, inasmuch as the sponge can, in many localities, be produced at much less cost than pig-iron, and as the sponge has suffered none of the contaminations of the blast-furnace, the result is a much higher grade of steel than that obtained where wrought-iron made from the pig is the stock used.

Having thus described my improvement in the manufacture of iron and steel, what I claim as my invention, and desire to secure by Letters Patent, is—

1. In the manufacture of wrought-iron by the puddling process, the adding of iron sponge in a cold state to the pig-iron after it is melted in the puddling-chamber, substantially as and for the purpose hereinbefore described.

2. The manufacture of wrought-iron from iron sponge by the treatment of the sponge previously mixed with a suitable flux for protecting the particles of metal from oxidation, substantially as hereinbefore described.

3. In the manufacture of steel from iron sponge by the crucible process, the treating of the iron sponge while protected from oxidation, and compressing the sponge while in a heated condition, substantially as and for the purpose hereinbefore described.

4. In the manufacture of cast-steel from iron sponge by the crucible process, the mixing of a suitable flux with the iron sponge to neutralize the action of the silicic acid or other foreign ingredient therein, previously to the heating and compression thereof, substantially as and for the purpose hereinbefore described.

5. The manufacture of cast-steel from iron sponge by melting the iron sponge in a bath of molten pig-metal, the iron sponge being directly charged in a loose cold state, substantially as hereinbefore described.

6. The manufacture of cast steel from iron sponge by charging the iron sponge in masses previously compressed and heated, or in a plastic condition, into a bath of molten pig-metal, and melting it therein, substantially as and for the purposes hereinbefore described.

In testimony whereof I, the said THOMAS S. BLAIR, have hereunto set my hand.

THO. S. BLAIR.

Witnesses:
MORRISON FOSTER,
THOS. B. KERR.